Sept. 20, 1938.   F. S. STICKNEY ET AL   2,130,863
ELECTRICAL MEASURING INSTRUMENT
Filed April 16, 1936

WITNESSES:

INVENTORS
Fernald S. Stickney and
Douglass A. Young.
BY
ATTORNEY

Patented Sept. 20, 1938

2,130,863

UNITED STATES PATENT OFFICE 2,130,863

ELECTRICAL MEASURING INSTRUMENT

Fernald S. Stickney, Verona, and Douglass A. Young, East Orange, N. J., assignors to Westinghouse Electric & Manufacturing Company, East Pittsburgh, Pa., a corporation of Pennsylvania Application April 16, 1936, Serial No. 74,715

2 Claims. (Cl. 73—151)

The invention relates to electrical measuring instruments of the indicating type such as ammeters, voltmeters, and the like, and more particularly to an instrument casing of improved construction.

The electrical measuring instrument art is a highly refined one and the competitive situation is such that every effort must be made toward simplifying the construction of the instrument movement and its casing to permit of quantity production at a low factory cost without sacrificing the electrical or mechanical efficiency of the instrument as a whole. The production of a casing for an instrument susceptible of mass production at a minimum cost has received substantial attention. In instruments now on the market, it is common practice to mount the instrument movement on a base plate and enclose the movement with a cover having a front wall with a transparent portion, to permit reading the instrument indication and side walls constituting a chamber having the same internal dimensions as the external dimensions of the base plate. The body portion and base plate, therefore, have a telescopic fit and are secured together by screws extending laterally through the side walls of the body into the edge of the base plate. With this type of construction, quite obviously it is necessary that the fit between the edge of the base and the side walls of the body portion be accurately made to prevent the entrance of dust and moisture into the interior of the instrument casing. This, of course, is an expensive operation because of the unavoidable manufacturing discrepancies encountered in quantity production.

It is an object of the present invention to avoid the foregoing difficulties in an inexpensive and efficient manner, including a construction in which manufacturing discrepancies are of no great importance and having an improved means for securing the base plate to the side walls of the instrument casing in a manner to obtain a maximum visibility through the usual transparent face of the instrument and at the same time avoid an excessive thickness and consequent weight of the side walls of the casing.

Figure 1:
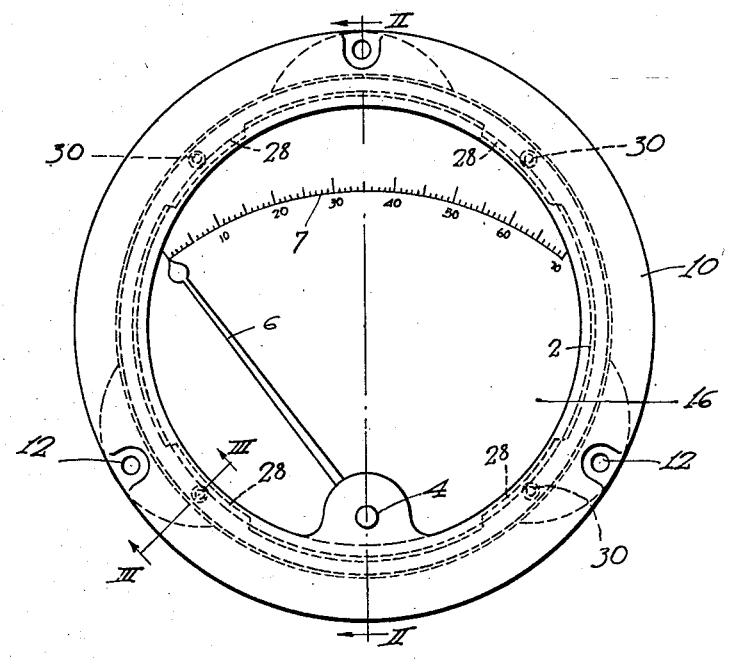

Other objects of the invention will be apparent from the following description and the accompanying drawing, wherein Figure 1 is a view in front elevation of an electrical measuring instrument constructed in accordance with the present invention.

Figures 2, 3:
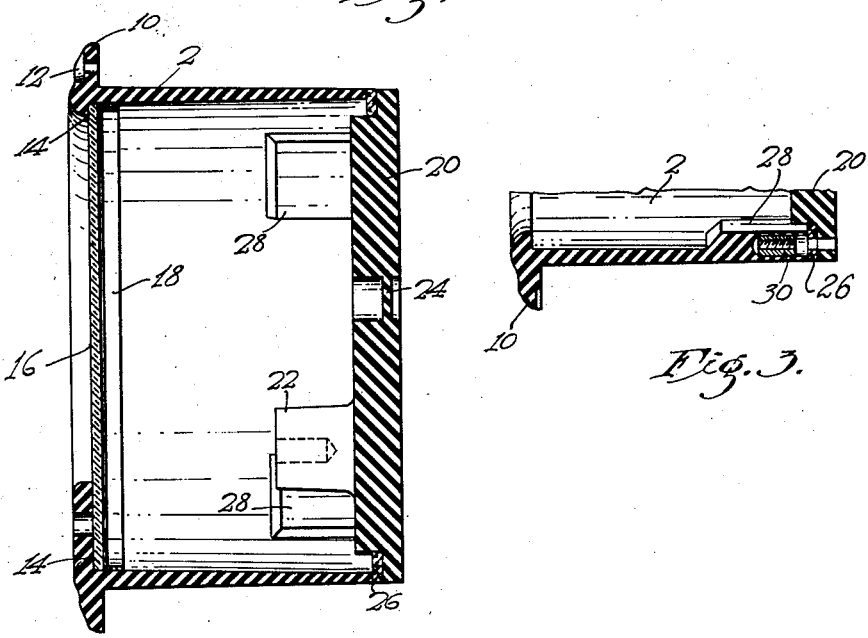

Fig. 2 is a view in vertical section on the line II—II of Fig. 1 with the instrument mechanism removed, and Fig. 3 is a fragmentary enlarged view in vertical section taken on the line III—III of Fig. 1.

Referring more particularly to the drawing and as shown more clearly in Fig. 1, the instrument comprises a casing 2, preferably of a molded phenolic condensation product, enclosing an instrument movement including a shaft 4 rotatable in accordance with a quantity to be measured in a usual manner for actuating a pointer 6 across a scale 7. The particular type of instrument movement is not an important aspect of the invention, and it is believed that no further illustration or description thereof is required.

Referring more particularly to Fig. 2, the casing 2 comprises a body portion substantially cylindrical in shape having at the front end thereof an outwardly extending flange 10 with apertures 12 therein for securing the flange to a support. As indicated in Fig. 1, three apertures 12 are provided for receiving screws, bolts or the like for engaging the supporting structure through which the body portion of the casing extends.

The front end of the casing is also provided with an inwardly projecting flange 14 adapted to constitute an abutment for a transparent plate 16 which is held against the flange 14 in any suitable manner as by a spring ring 18. It is an important aspect of the invention that the width of the flange 14 shall be a minimum consistent with properly maintaining the transparent plate 16 in position because this will afford the maximum visibility of the scale and hence permit the use of a scale of the maximum length. Of course, if desired, gaskets may be provided between the flange 14, plate 16 and ring 18, or between either of these elements, as desired, to maintain a dust-proof closure at this end of the casing.

The opposite end of the casing is provided with a closure plate 20 having a raised central portion with one or more projections 22 thereon to which the measuring instrument movement may be secured, and any desired number of knock-outs 24 for accommodating the terminals of various types of movement.

The base 20 is provided with a peripheral flange or rim portion, of substantially the same diameter as the external diameter of the casing 2, which is adapted to confront the edge face of the casing 2 as indicated in Fig. 2. With this type of construction, manufacturing discrepancies in the diameters of the various parts is not of particular moment because, quite apparently, considerable variation may occur and there still will be sufficient area of contact between the edge face of the casing and the peripheral flange of the base 20. Quite apparently if desired, or if necessary, a gasket 26 may be provided between these surfaces to further minimize the possibility of dust or moisture entering the casing.

A plurality of lugs 28 are formed integrally with the inner wall of the body portion of the casing extending from the rear peripheral edge of the body portion toward the front of the casing in a direction parallel to the axis of the casing but terminating short of the front edge of the casing. As indicated in Fig. 1, four of such lugs are provided although obviously as many may be provided as desired.

Each of the lugs 28 is of a height, radially of the casing, slightly less than the width of the front flange 14, and each is provided with a bore extending parallel to the axis of the casing for receiving a threaded metal insert 30 molded therein. Apertures are provided through the base plate 20 in positions to register with the threaded members 30 and screws may be inserted therethrough into said member 30 for rigidly attaching the base 20 to the body of the casing.

As indicated in Fig. 2, the raised central portion on the base 20 is of such diameter that the laterally extending flange or rim abuts not only the edge face of the body portion but also the faces of the lugs 28. Further, although the internal diameter of the casing between diametrically opposite lugs is less than the diameter of the transparent plate 16, as well as of the dial and retaining ring 18, the lug thickness is so chosen that these elements may be inserted past the lugs by tilting them.

In accordance with the construction disclosed, the body of the casing is efficiently and inexpensively secured to the base 20 upon which the instrument movement is mounted, and, at the same time, the weight and thickness of the casing side walls are maintained at a minimum. If, for example, the internal diameter of the casing was the same as the distance between diametrically opposed lugs, the side wall of the casing would be undesirably thick and expensive. On the other hand, since the external diameter of the case must remain fixed to correspond to switchboard apertures of standardized size, the thickened wall of the casing would result in flange 14 extending closer to the axis of the case than as shown in Fig. 2. This, of course, would reduce the available visibility area of the dial of the instrument, and afford less space within the casing than is required.

Quite apparently modifications in the structure shown may be made but it is intended that the scope of the invention shall not be limited except as set forth in the appended claims.

We claim as our invention:

1. An instrument casing comprising a cylindrical body portion of molded material, a closure for one end thereof comprising a narrow inwardly projecting peripheral flange integral therewith and a transparent disc within the body having substantially the same diameter as the inner diameter of the body disposed against said flange, a plate for supporting an instrument movement and for closing the other end of the body having an instrument movement supporting portion extending into the body surrounded by a peripheral rim of substantially the same diameter as the outer diameter of the body and a width greater than the wall thickness thereof, securing means extending parallel to the axis of the body for securing said plate thereto, and a gasket between said rim and peripheral edge of the body, said securing means including lugs integral with the inner wall of the body extending from the edge of the body parallel to the axis of the latter and terminating short of said inwardly projecting flange, and being of slightly less height radially of the body than the width of said flange.

2. An instrument casing comprising a one-piece substantially cylindrical hollow body portion open at both ends, and having an integral flange projecting inwardly at one end, a closure for said end of substantially the same diameter as the bore of the body portion to be inserted from the opposite end to abut said flange, a plurality of lugs integral with the body portion adjacent to said opposite end and projecting into the bore of the body portion, said lugs being of such dimensions radially of said bore and parallel to the axis thereof as to permit the insertion of said closure into its proper position, a cover for said opposite end and means extending parallel to the axis of the bore from said opposite end through said cover and into said lugs for securing it in position.

FERNALD S. STICKNEY.
DOUGLASS A. YOUNG.